(12) United States Patent
Vargas Garcia et al.

(10) Patent No.: US 12,415,405 B2
(45) Date of Patent: Sep. 16, 2025

(54) AIR REGISTER ASSEMBLY

(71) Applicant: Ford Global Technologies, LLC, Dearborn, MI (US)

(72) Inventors: Carmen Frida Vargas Garcia, Cuautitlan Izcalli (MX); Luis Adrian Tena Han, Tlalnepantla de Baz (MX)

(73) Assignee: Ford Global Technologies, LLC, Dearborn, MI (US)

( * ) Notice: Subject to any disclaimer, the term of this patent is extended or adjusted under 35 U.S.C. 154(b) by 552 days.

(21) Appl. No.: 17/854,369

(22) Filed: Jun. 30, 2022

(65) Prior Publication Data

US 2024/0001738 A1   Jan. 4, 2024

(51) Int. Cl.
 B60H 1/34   (2006.01)

(52) U.S. Cl.
 CPC .................... B60H 1/3428 (2013.01)

(58) Field of Classification Search
 CPC .. B60H 1/3428; B60H 3/0007; B60H 3/0028; B60H 1/0065; F24F 1/008; F24F 1/0355; F24F 13/08; F24F 13/10; F24F 13/12; F24F 13/14; F24F 2013/207
 See application file for complete search history.

(56) References Cited

U.S. PATENT DOCUMENTS

| | | |
|---|---|---|
| 10,173,607 B1 | 1/2019 | Omelchenko et al. |
| 10,350,968 B2 | 7/2019 | Avendano Arenas et al. |
| 10,442,275 B2 | 10/2019 | Quintanar et al. |
| 2003/0186643 A1 | 10/2003 | Feuillard et al. |
| 2018/0009293 A1* | 1/2018 | Quintanar ............... A61L 9/122 |
| 2018/0140736 A1 | 5/2018 | Webb |
| 2019/0077228 A1 | 3/2019 | Goto |
| 2021/0101452 A1* | 4/2021 | Ovando Sánchez ........................ B60H 1/3421 |
| 2021/0356147 A1 | 11/2021 | Basile |
| 2022/0134848 A1 | 5/2022 | Araujo Nieto et al. |

FOREIGN PATENT DOCUMENTS

| | | | |
|---|---|---|---|
| AU | 647363 B3 * | 3/1994 | |
| CN | 110584987 A | 12/2019 | |
| DE | 102005025409 A1 * | 1/2006 | ............... A61L 9/12 |
| FR | 2893539 A1 | 2/2011 | |
| JP | H07213595 A | 8/1995 | |
| JP | 2017144900 A | 8/2017 | |

(Continued)

OTHER PUBLICATIONS

English translation of DE-102005025409-A1, dated Dec. 6, 2024 (Year: 2024).*

*Primary Examiner* — Edelmira Bosques
*Assistant Examiner* — Brett Peterson Mallon
(74) *Attorney, Agent, or Firm* — Vichit Chea; Price Heneveld LLP (57) ABSTRACT

An air register assembly for a vehicle includes a barrel and vanes operably coupled to the barrel. A knob assembly is operably coupled to the barrel and the vanes. The knob assembly includes a support body, at least one absorbent basket selectively coupled to the support body, and a cover selectively coupled over the at least one absorbent basket. The cover is configured to rotate between an opened position and a closed position. The opened position is configured to provide fluid communication with the at least one absorbent basket via apertures defined by the cover.

19 Claims, 8 Drawing Sheets

(56) References Cited

FOREIGN PATENT DOCUMENTS

| | | |
|---|---|---|
| KR | 0127045 B1 | 4/1998 |
| KR | 20070063088 A1 | 6/2007 |
| KR | 20120072692 A | 11/2012 |
| WO | 2006079674 A1 | 8/2006 |

* cited by examiner

FIG. 10 ic # AIR REGISTER ASSEMBLY

FIELD OF THE DISCLOSURE

The present disclosure generally relates to an air register assembly. More specifically, the present disclosure relates to an air register assembly for a vehicle.

BACKGROUND OF THE DISCLOSURE

Many vehicles include a heating, ventilation, and air conditioning system to direct air into a passenger cabin. Air vents may direct air from the heating, ventilation, and air conditioning system to various locations within the passenger cabin.

SUMMARY OF THE DISCLOSURE

According to at least one aspect of the present disclosure, a vehicle air register assembly includes a housing defining an outlet. A barrel is disposed within the housing proximate to the outlet. The barrel is rotatably coupled to the housing. A frame is coupled to the barrel. Vanes are rotatably coupled to the frame proximate to the outlet. A knob assembly is coupled to the frame adjacent to the vanes. The knob assembly includes a support body defining an interior. Pivots extend from the support body to engage the frame. An engagement shaft extends through the interior of the support body. An absorbent basket is coupled to the engagement shaft. The absorbent basket is configured to absorb a fluid for providing a scent. A cover is selectively coupled over the absorbent basket. The cover defines apertures to provide fluid communication with the absorbent basket.

According to another aspect of the present disclosure, an air register assembly for a vehicle includes a barrel and vanes operably coupled to the barrel. A knob assembly is operably coupled to the barrel and the vanes. The knob assembly includes a support body, at least one absorbent basket selectively coupled to the support body, and a cover selectively coupled over the at least one absorbent basket. The cover is configured to rotate between an opened position and a closed position. The opened position is configured to provide fluid communication with the at least one absorbent basket via apertures defined by the cover.

According to another aspect of the present disclosure, a knob assembly for a vehicle air register includes a support body defining an interior. An engagement shaft extends through the interior. An absorbent basket includes a base and an outer shell defining an interior. The absorbent basket is coupled to the engagement shaft. An absorbing material is disposed within the interior of the absorbent basket. A cover is selectively coupled over the absorbent basket. The cover defines apertures and is operable between an opened position and a closed position.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION

Additional features and advantages of the presently disclosed device will be set forth in the detailed description which follows and will be apparent to those skilled in the art from the description, or recognized by practicing the device as described in the following description, together with the claims and appended drawings.

Figure 1:
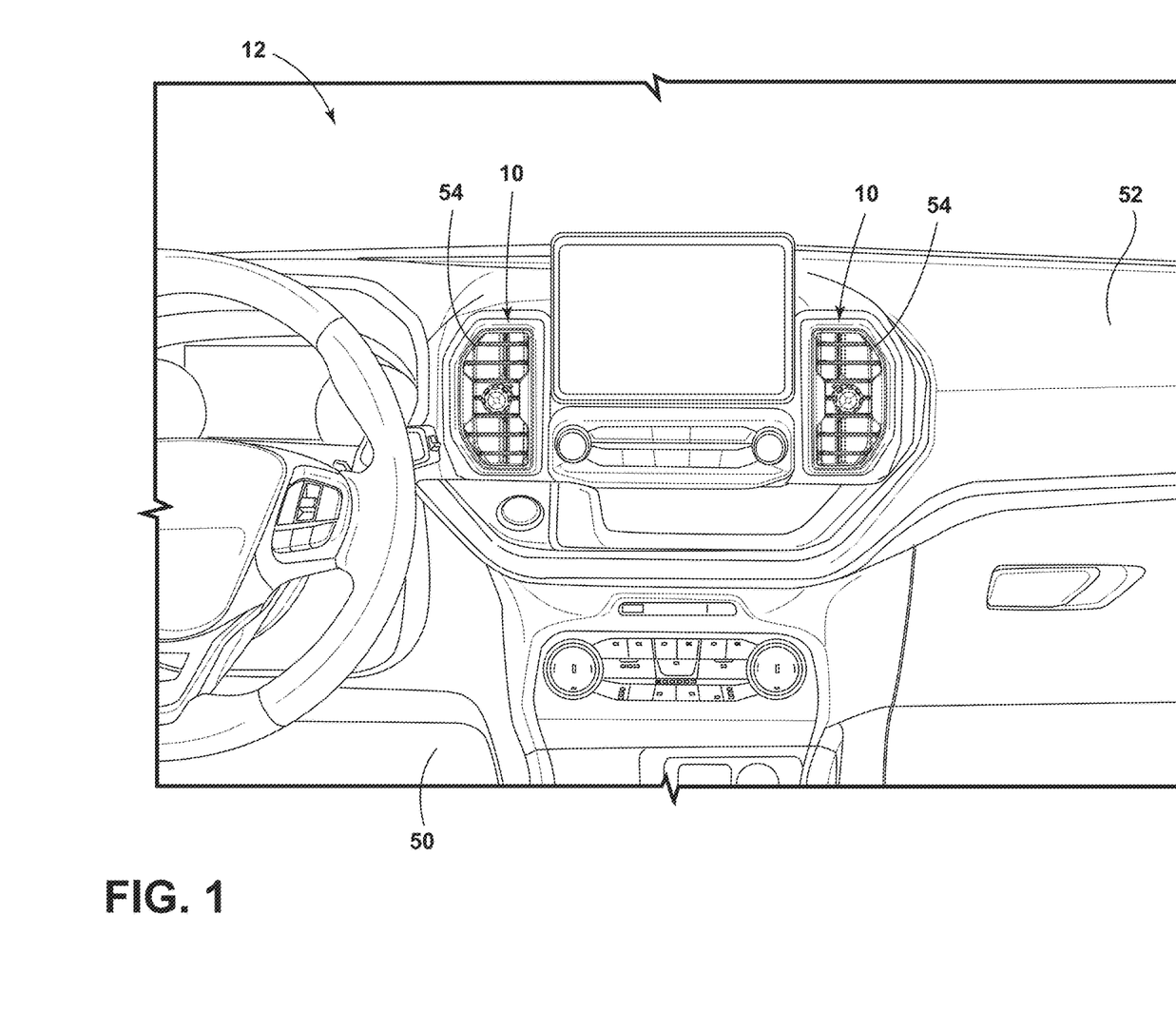
FIG. 1 is a partial front perspective view of a dashboard with air register assemblies, according to the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

With reference to FIGS. 1-10, reference numeral 10 generally designates an air register assembly 10 for a vehicle 12 that includes a housing 14 defining an outlet 16. A barrel 18 is disposed within the housing 14 proximate to the outlet 16. The barrel 18 is rotatably coupled to the housing 14. A frame 20 is coupled to the barrel 18. Rotating vanes 22 are rotatably coupled to the frame 20. A knob assembly 24 is coupled to the frame 20 adjacent to the rotating vanes 22. The knob assembly 24 includes a support body 26 that defines an interior 28. Pivots 30 extend from the support body 26 to engage the frame 20. The knob assembly 24 also includes an engagement shaft 32 extending through the interior 28 of the support body 26 and an absorbent basket 34 coupled to the engagement shaft 32. The absorbent basket 34 is configured to absorb fluid for providing a scent. The knob assembly 24 also includes a cover 36 selectively coupled over the absorbent basket 34. The cover 36 defines apertures 38 to provide fluid communication with the absorbent basket 34.

The vehicle 12 includes an interior compartment 50 with multiple air register assemblies 10. For example, as illustrated in FIG. 1, an instrument panel or dashboard 52 extends within the interior compartment 50 and includes openings 54 for positioning the air register assemblies 10. The air register assemblies 10 direct air from a heating, ventilation, and air-conditioning (HVAC) system and into the interior compartment 50. The HVAC system generally cleans, cools, heats, ventilates, and/or dehumidifies air directed into the interior compartment 50. The air register assemblies 10 are configured to guide, direct, or deflect the air to various locations within the interior compartment 50.

The vehicle 12 may include multiple air register assemblies 10 disposed in various locations within the interior compartment 50. The vehicle 12 may be a sedan, a sport-utility a vehicle 12, a van, a truck, a crossover, other styles of wheeled motor vehicles 12, or other types of vehicles 12. The vehicle 12 may be a manually operated vehicle 12 (e.g., with a human driver), a fully autonomous vehicle 12 (e.g., with no human driver), or a partially autonomous vehicle 12 (e.g., operated with or without a human driver). Additionally, the vehicle 12 may be utilized for personal and/or commercial purposes, such as ride-providing services (e.g., chauffeuring), ridesharing services, and delivery services. The specific location and number of the air register assemblies 10 within the vehicle 12 may depend on the configuration and uses of the vehicle 12.

Figure 2:
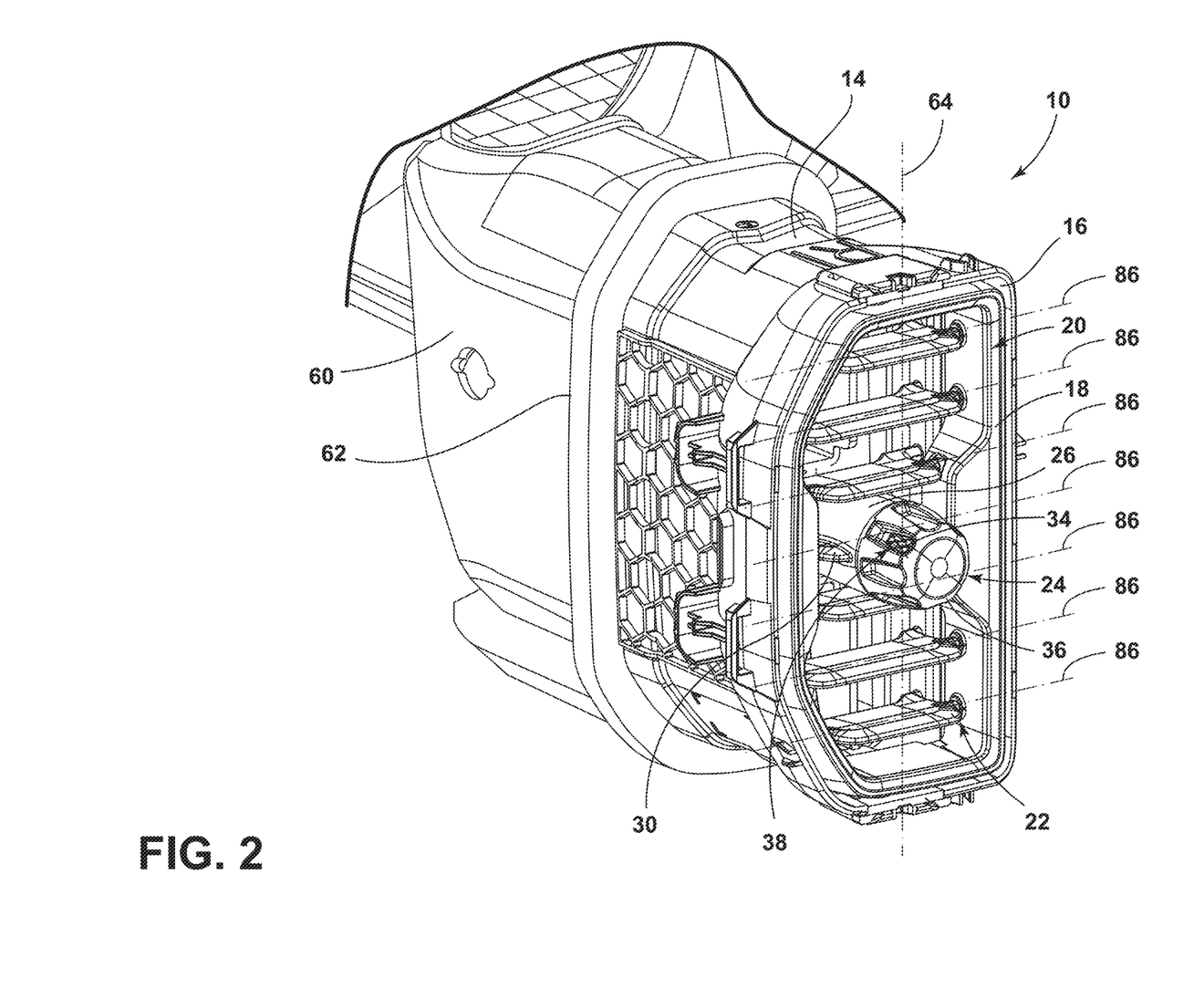
FIG. 2 is a side perspective view of an air register assembly coupled to ducting, according to the present disclosure.
Figure 3:
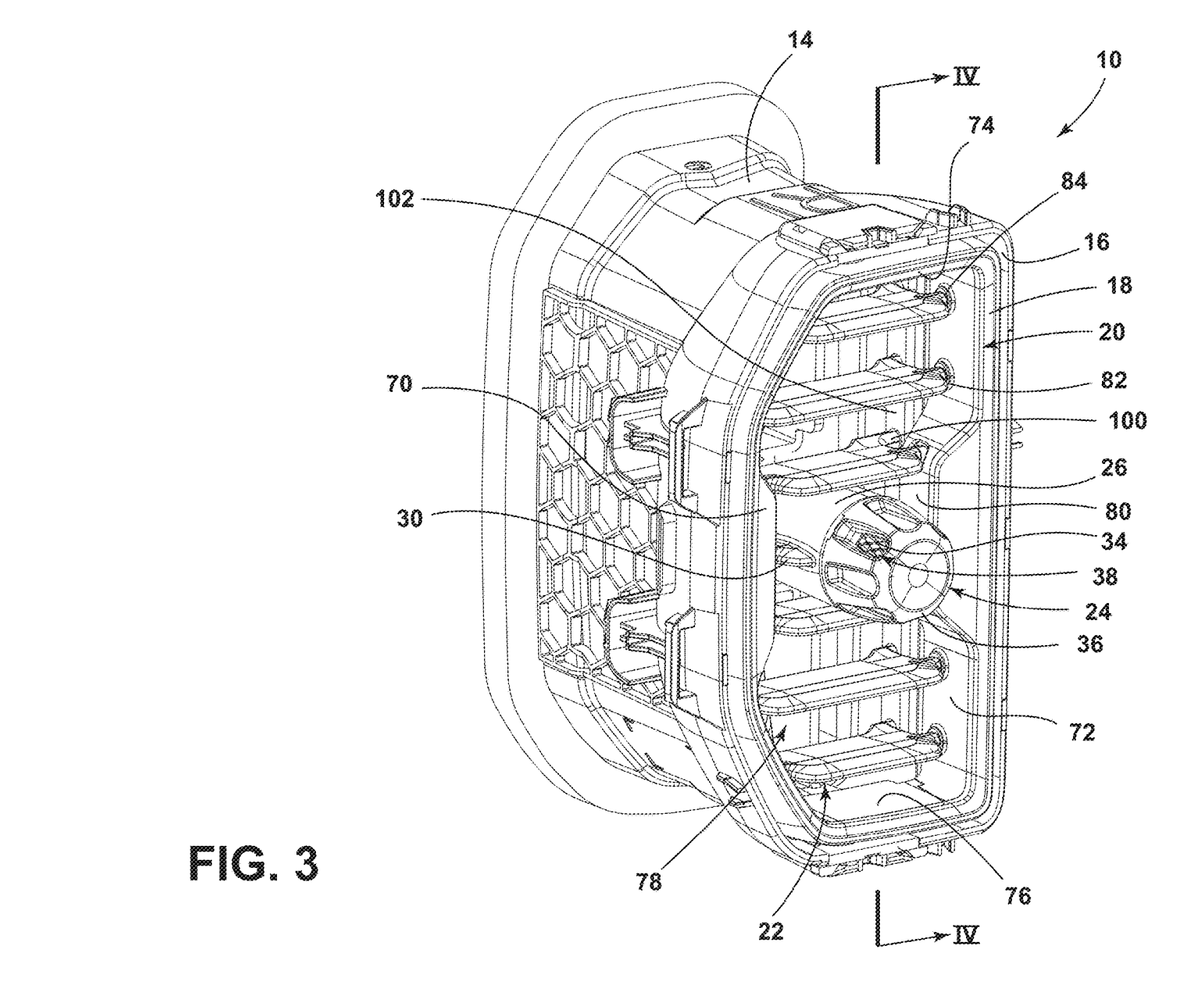
FIG. 3 is a side perspective view of an air register assembly, according to the present disclosure.

Referring to FIGS. 2 and 3, the air register assembly 10 includes the housing 14 configured to engage the dashboard 52 to align and retain the air register assembly 10 within the opening in the dashboard 52. The outlet 16 of the housing 14 is generally coplanar with the dashboard 52. The housing 14 is coupled to ducting 60 that extends from the HVAC system. An inlet 62 of the housing 14 is disposed adjacent to the ducting 60. Air is directed from the HVAC system, through the ducting 60, through the housing 14, and into the interior compartment 50 (FIG. 1).

The air register assembly 10 includes the barrel 18 disposed at least partially within the housing 14 proximate the outlet 16. The barrel 18 is rotatably coupled to the housing 14, allowing the barrel 18 to rotate about an axis 64 to direct air in different directions. For example, in the illustrated configuration, the barrel 18 is configured to rotate about the vertical axis 64 to direct air in various cross-car directions. The barrel 18 has an elongated shape with a greater longitudinal extent than the lateral extent. In the illustrated configuration, the barrel 18 has a substantially reverse "D"-shape where one lateral side is generally linear and the opposing lateral side is rounded, having a center portion extending between upper and lower angled portions. It is contemplated that the air register assembly 10 may also be rotated, such as about 90°, such that the barrel 18 has a greater lateral extent than longitudinal extent without departing from the teachings herein. The barrel 18 may define any practicable configuration for engaging the housing 14.

The outlet 16 of the housing 14 generally corresponds with the shape and size of the barrel 18. In this way, when the barrel 18 is in a center position, the barrel 18 extends along a perimeter of the outlet 16. When the barrel 18 is in angled positions, the barrel 18 may extend at least partially through the outlet 16. The passenger within the vehicle 12 may manually adjust the angle of the barrel 18, which determines a direction of the airflow. The passenger may apply a force to the barrel 18, the rotating vanes 22, or the knob assembly 24 to adjust the air register assembly 10 to the desired angle. The housing 14 may have any practicable configuration for directing air into the interior compartment 50 and allowing movement of the barrel 18.

Referring still to FIGS. 2 and 3, the air register assembly 10 includes the frame 20 that extends along an inner surface of the barrel 18 to maximize airflow through the air register assembly 10. The frame 20 includes opposing retainers 70, 72 and opposing connector portions 74, 76 of a support vane 78. The retainers 70, 72 extend along the longer lateral sides and generally follow the shape of the sides of the barrel 18. The first retainer 70 generally has a rounded shape that corresponds with the rounded side of the barrel 18, and the second retainer 72 generally has a linear shape corresponding with the linear side of the barrel 18. Additionally, at least one of the retainers 70, 72 may include a protruding portion 80 proximate to the knob assembly 24 to increase support for applied loads on the knob assembly 24 and the rotating vanes 22. The retainers 70, 72 each define recesses or receiving holes 82 configured to receive pivot members 84 of the rotating vanes 22 and the pivots 30 of the knob assembly 24.

The support vane 78 extends along the longitudinal extent of the barrel 18 and includes the two opposing connector portions 74, 76. The connector portions 74, 76 are configured to couple to the upper and lower sides of the barrel 18, respectively. Additionally, the connector portions 74, 76 extend between and are coupled to the retainers 70, 72. The connector portions 74, 76 are generally configured to interlock with ends of the retainers 70, 72 to provide additional support to the air register assembly 10 and retain the components of the frame 20 in the select configuration along the inner surface of the barrel 18.

Referring still to FIGS. 2 and 3, the rotating vanes 22 extend between and are rotatably coupled to the retainers 70, 72 at the receiving holes 82. The rotating vanes 22 are generally arranged spaced apart at equidistant intervals from the upper side of the barrel 18 to the lower side of the barrel 18. Accordingly, the rotating vanes 22 generally extend laterally across the air register assembly 10. In the illustrated configuration, the receiving holes 82 defined in the first retainer 70 are horizontally aligned with the receiving holes 82 defined in the second retainer 72. Each vane includes the pivot members 84 that engage the receiving holes 82 and are configured to rotate about respective horizontal axes 86 to direct air at different vertical locations in the interior compartment 50 (FIG. 1).

While the rotating vanes 22 are generally spaced at equidistant intervals, a larger space is defined between two central rotating vanes 22 to accommodate the knob assembly 24 therebetween. The knob assembly 24 includes the pivots 30 that rotatably couple to the retainers 70, 72 via the receiving holes 82 in a similar manner as the rotating vanes 22. The pivots 30 may also operate to guide, direct, or deflect flowing through the air register assembly 10 similar to the rotating vanes 22. It is also contemplated that the knob assembly 24 may be integrally formed with a center rotating vane 22.

Figure 4:
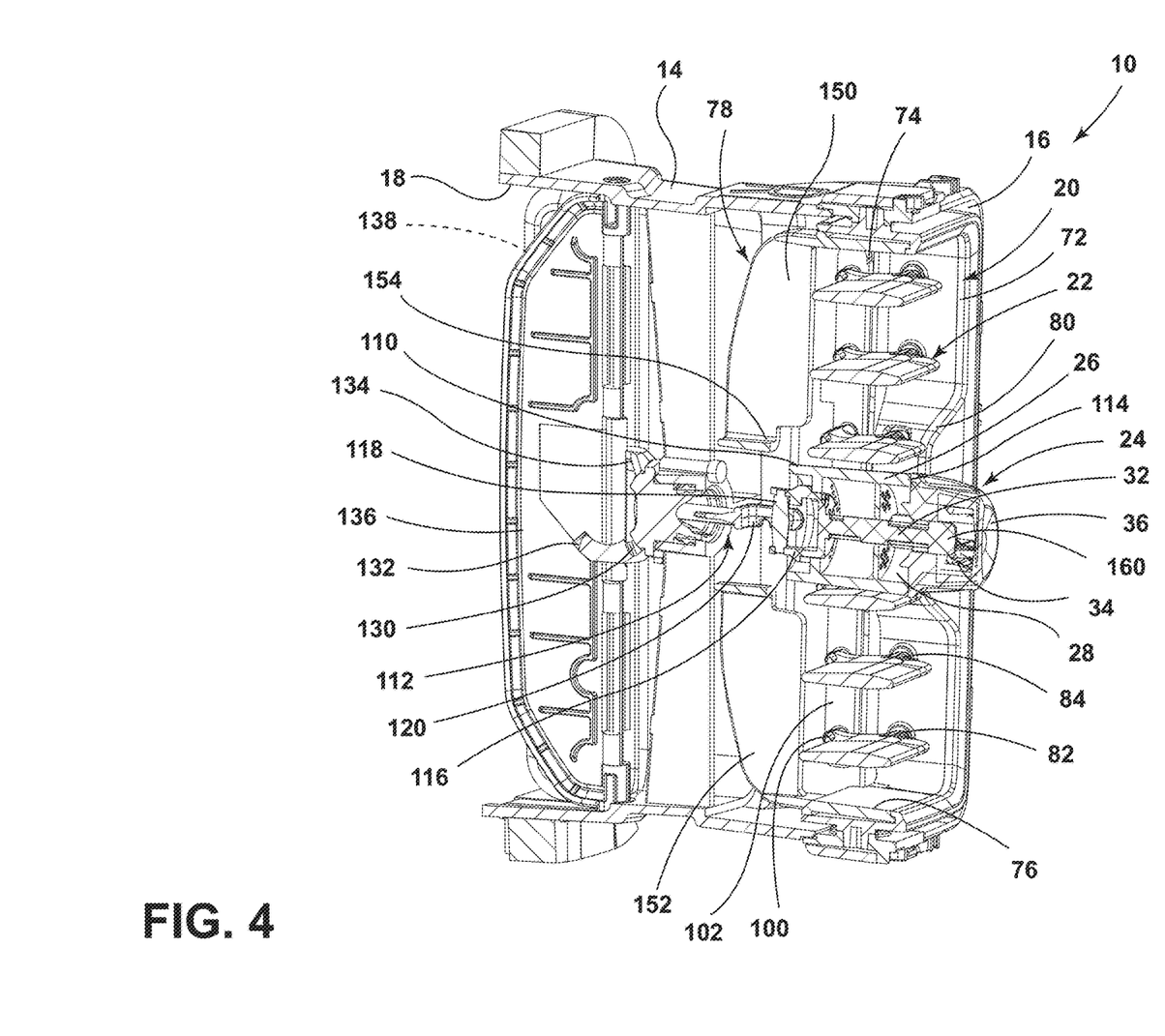
FIG. 4 is a cross-sectional view of the air register assembly of FIG. 3, taken along line IV-IV, according to the present disclosure.

Referring still to FIG. 3, as well as FIG. 4, each rotating vane 22 and the knob assembly 24 includes a linking projection 100 that extends from an upstream portion thereof, respectively. Each linking projection 100 engages a link bar 102 that extends adjacent to the second retainer 72. The link bar 102 operates to couple each of the rotating vanes 22 and the knob assembly 24 to allow simultaneous rotation of the rotating vanes 22 and the knob assembly 24. The link bar 102 is generally disposed upstream of and adjacent to the second retainer 72. It is contemplated that the link bar 102 may be disposed proximate to the first retainer 70 without departing from the teachings herein.

The knob assembly 24 is centrally located in the middle of the arrangement of the rotating vanes 22. The knob assembly 24 provides a grasping location for the passenger within the vehicle 12 to adjust aspects of their register assembly. As the knob assembly 24 is rotated about the respective horizontal axis 86 that extends between the first and second retainers 70, 72, the knob assembly 24 causes the link bar 102 to be vertically adjusted, which then adjusts the remaining rotating vanes 22 by the connections between the linking projections 100 and link bar 102. Accordingly, manipulation of the knob assembly 24 adjusts the link bar 102, which simultaneously adjusts each of the rotating vanes 22 coupled to link bar 102.

The knob assembly 24 is utilized to adjust the position of the barrel 18 about the respective vertical axis 64 and is also utilized to adjust the rotating vanes 22 about the respective horizontal axes 86. The knob assembly 24 is adjustable in the cross-car direction (e.g., left and right) to rotate the barrel 18 and adjust the airflow in the cross-car direction. The knob assembly 24 is also vertically adjustable between different angles to rotate the rotating vanes 22 and consequently adjust the airflow in the vertical direction. It is contemplated that the orientation of the air register assembly 10 may be adjusted such that movement of the knob in the cross-car direction adjusts the rotating vanes 22 and movement in the vertical direction adjusts the barrel 18 without departing from the teachings herein.

Referring still to FIGS. 3 and 4, the knob assembly 24 includes the support body 26 defining the interior 28, which is substantially hollow. The pivots 30 extend in opposing directions from the support body 26 to engage the retainers 70, 72. The engagement shaft 32 extends through the interior 28 of the support body 26. The engagement shaft 32 extends through an upstream end 110 of the support body 26 to engage a damper adjustment assembly 112 and through a downstream end 114 of the support body 26 to engage the absorbent basket 34.

The engagement shaft 32 includes a bracket 116 proximate the upstream end 110 of the support body 26. The bracket 116 extends away from the support body 26 and includes a crossbar 118 for operably coupling the support body 26 to the damper adjustment assembly 112. The damper adjustment assembly 112 includes a support link 120 rotatably coupled to the crossbar 118. The rotating engagement between the support link 120 and the crossbar 118 allows the support body 26 to be rotated about the horizontal rotational axis 86 to adjust the positions of the rotating vanes 22 without adjusting the position of the damper adjustment assembly 112.

Rotation of the cover 36 causes rotation of the engagement shaft 32, including the crossbar 118, which, consequently, causes the damper adjustment assembly 112 to be adjusted. The damper adjustment assembly 112 includes a drive gear 130, which is driven by rotation of the engagement shaft 32. The drive gear 130 is configured to engage follower gears 132, 134 of the damper adjustment assembly 112 that are each coupled to a damper plate 136, 138, respectively. The rotation of the drive gear 130 causes rotation of the follower gears 132, 134 to open and close the damper plates 136, 138, which open and close an airflow path through the air register assembly 10.

Figure 5:
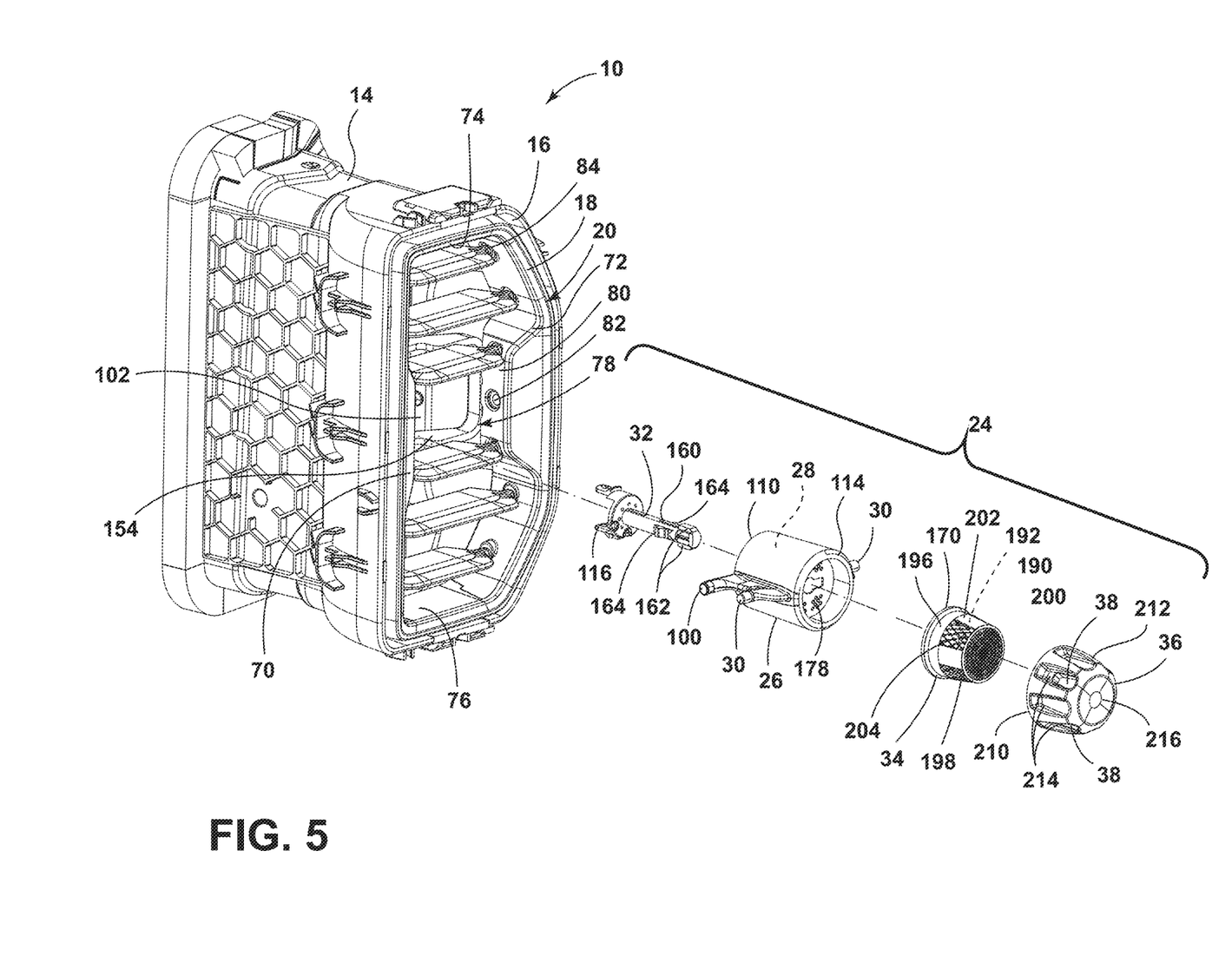
FIG. 5 is a partially exploded side perspective view of an air register assembly with a knob assembly including an absorbent basket and a cover, according to the present disclosure.

Referring still to FIGS. 3 and 4, as well as FIG. 5, the air register assembly 10 includes the support vane 78 extending along the longitudinal extent of the barrel 18 and forming a portion of the frame 20. The support vane 78 is generally disposed upstream of the rotating vanes 22 within an interior 14 of the housing 14. The support vane 78 provides additional support to the air register assembly 10. The support vane 78 includes the connector portions 74, 76 that form part of the frame 20. The connector portions 74, 76 are vertically aligned with the rotating vanes 22. A vane portion 150, 152 extends from each of the connector portions 74, 76 toward the knob assembly 24, respectively. In this way, the first vane portion 150 is disposed on one side of the knob assembly 24 (e.g., above the knob assembly 24), and the second vane portion 152 is disposed on the opposing side of the knob assembly 24 (e.g., below the knob assembly 24).

The vane portions 150, 152 generally extend vertically, orthogonal or normal to the rotating vanes 22. The vane portions 150, 152 extend upstream from the rotating vanes 22 and are configured to guide, direct, or deflect air flowing through the air register assembly 10 in the cross-car direction. The support vane 78 includes a U-shaped center portion 154 between the vane portions 150, 152. The center portion 154 couples the vane portions 150, 152 to one another and provides space for the knob assembly 24. Generally, the center portion 154 extends toward one of the lateral sides of the barrel 18 and couples to the barrel 18 proximate to the respective retainer 72.

Figures 6, 7:
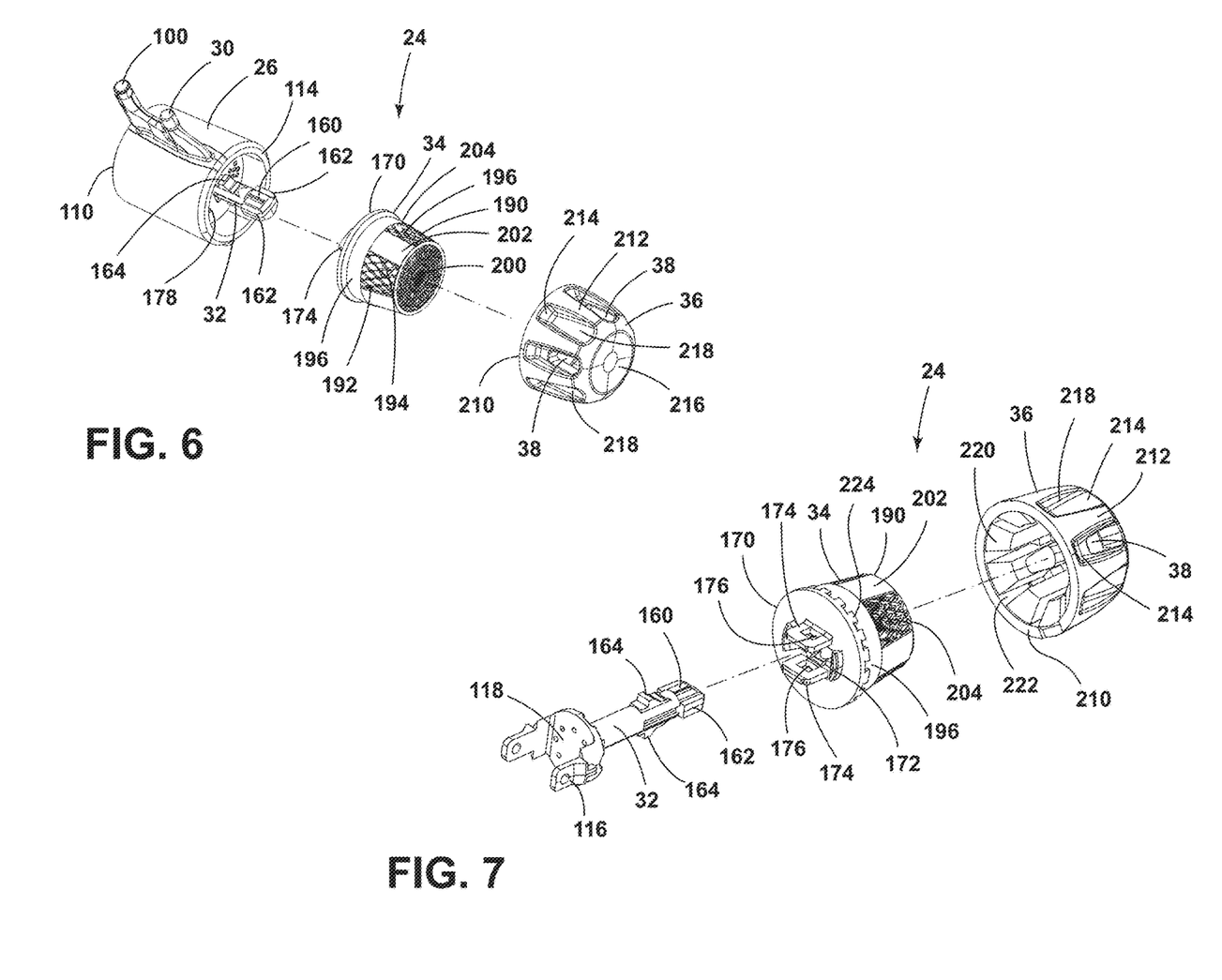
FIG. 6 is a partially exploded side perspective view of a knob assembly including a cover disengaged from an absorbent basket, according to the present disclosure.
FIG. 7 is a side perspective view of a knob assembly for an air register assembly, according to the present disclosure.

Referring to FIGS. 6 and 7, a downstream portion 160 of the engagement shaft 32 includes locating protrusions 162 and coupling protrusions 164 extending therefrom. The locating protrusions 162 are further downstream compared to the coupling protrusions 164. The locating protrusions 162 are configured to align the engagement shaft 32 in the correct orientation relative to the absorbent basket 34. The absorbent basket 34 includes a base 170 that defines a receiving opening 172 for receiving the downstream portion 160 of the engagement shaft 32. The receiving opening 172 is shaped to receive the downstream portion 160 and the locating protrusions 162. The locating protrusions 162 may be elastically deformable to provide an interference fit between the engagement shaft 32 and the absorbent basket 34.

The absorbent basket 34 includes coupling projections 174 extending from the base 170. The coupling projections 174 define receiving apertures 176, and the coupling protrusions 164 on the engagement shaft 32 are configured to be disposed in the receiving apertures 176 to snap engage the engagement shaft 32 with the absorbent basket 34. The support body 26 includes a recessed region 178 providing space where the coupling projections 174 are configured to engage with the coupling protrusions 164 on the engagement shaft 32. The base 170 of the absorbent basket 34 is configured to abut the downstream end 114 of the support body 26. In this way, the absorbent basket 34 extends from the support body 26 and is coupled to the support body 26 through the engagement between the engagement shaft 32 and the coupling projections 174.

The absorbent basket 34 includes an outer shell 190 coupled to or including the base 170 and extending downstream therefrom. The outer shell 190 and the base 170 define a basket interior 192 for receiving an absorbing material 194. The outer shell 190 includes a rim 196 adjacent to the base 170, an outer wall 198 extending from the rim 196, and an end wall 200 coupled to the outer wall 198 and enclosing the basket interior 192. The rim 196 is smaller in diameter relative to the base 170, such that the base 170 provides an annular flange extending beyond the rim 196. The outer wall 198 is annular and has alternating solid portions 202 and perforated portions 204. The end wall 200 is generally perforated but may also be solid or a combination thereof.

The absorbing material 194 is disposed within the basket interior 192. Generally, the absorbent basket 34 is constructed of a plastic material that is sufficiently rigid to maintain a shape but may elastically deform. The absorbing material 194 is generally constructed of a fabric or foam material configured to absorb fluids and liquids. Generally, the absorbing material 194 is configured to receive a scented fluid for providing a scent in the air for passengers around the air register assembly 10.

Referring still to FIGS. 6 and 7, the cover 36 is configured to be disposed over the absorbent basket 34. Generally, the cover 36 snap engages over the absorbent basket 34. The snap engagement or interference fit between the absorbent basket 34 and the cover 36 may be formed through an engagement between an edge 210 of the cover 36 and one or both of the rim 196 and the base 170. The cover 36 has an annular wall 212, which defines a plurality of recessed regions 214. The recessed regions 214 extend from proximate the edge 210 toward a closed end 216 of the cover 36. The recessed regions 214 alternate between solid regions 218 and regions defining the apertures 38. The apertures 38 are configured to provide fluid communication with the absorbent basket 34 and the absorbing material 194 disposed therein.

In various aspects, the cover 36 defines a plurality of internal projections 220 and internal grooves 222 that alternate with one another around an interior of the cover 36. The internal projections 220 align with the recessed regions 214, while the internal grooves 222 are disposed between adjacent recessed regions 214. The internal projections 220 may engage the absorbent basket 34 to couple the cover 36 to the absorbent basket 34.

Additionally or alternatively, the absorbent basket 34 may define ribs 224, extending from the base 170 toward the end wall 200 and spaced apart along the rim 196. In such examples, the ribs 224 are configured to be inserted into the inner grooves of the cover 36. The ribs 224 may provide alignment for the engagement between the absorbent basket 34 and the cover 36 and may also provide an interference fit to couple the cover 36 to the absorbent basket 34. Additional shapes of the internal grooves 222 or additional space may be defined to allow for rotation of the cover 36 as described herein. In such examples, additional grooves extending perpendicular to the internal grooves 222 may allow the cover 36 to rotate relative to the absorbent basket 34 having the ribs 224.

Figure 8:
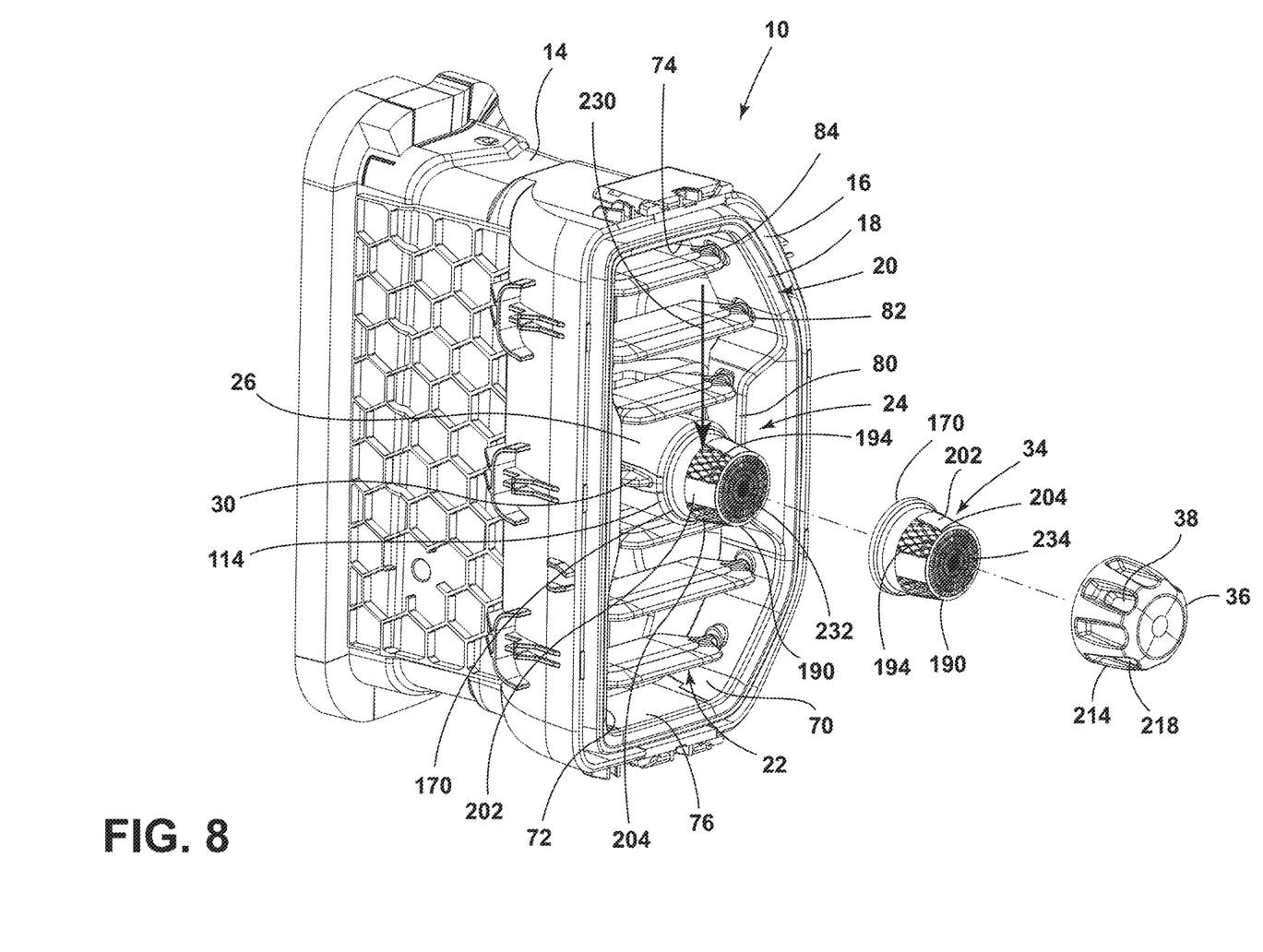
FIG. 8 is a partially exploded side perspective view of an air register assembly with a knob assembly having a removable cover and interchangeable absorbent baskets, according to the present disclosure.
Figure 9:
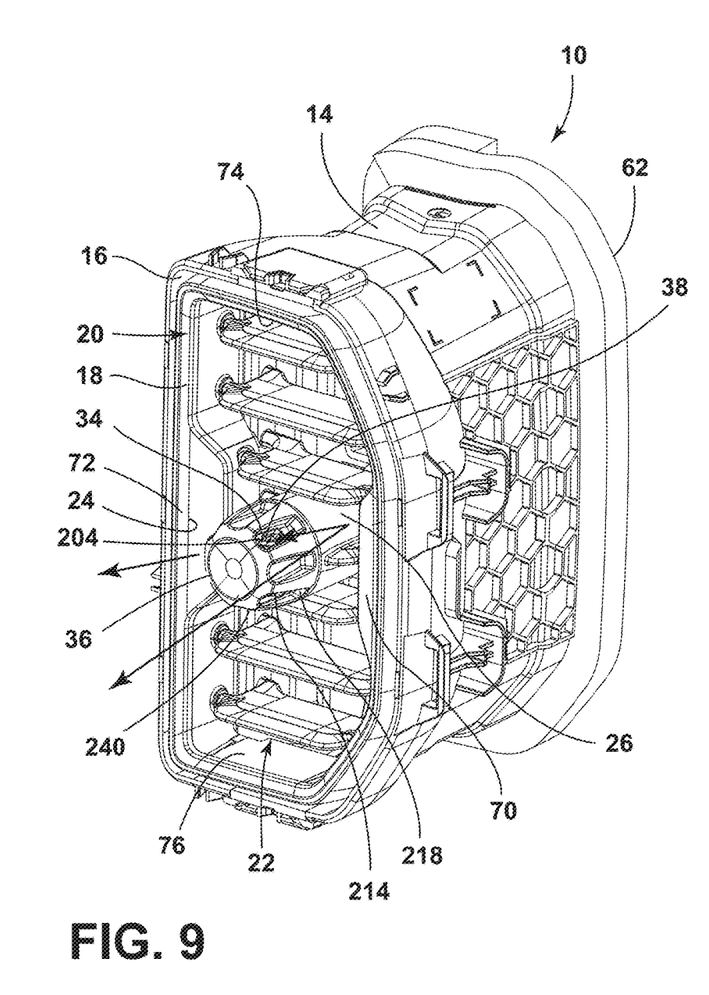
FIG. 9 is a side perspective view of an air register assembly with a cover of a knob assembly in an opened position, according to the present disclosure.
Figure 10:
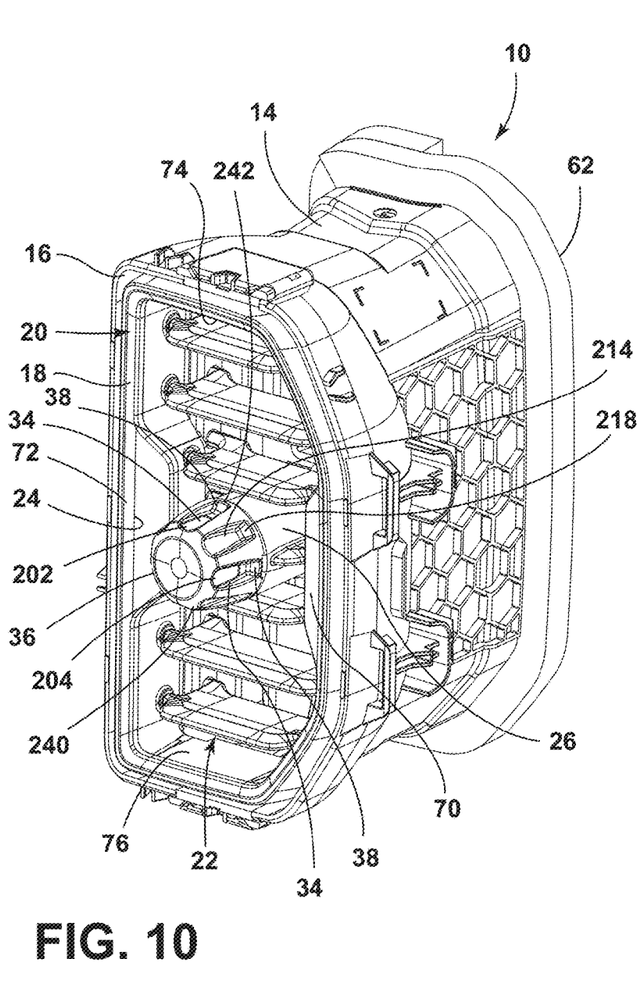
FIG. 10 is a side perspective view of an air register assembly with a cover of a knob assembly in a closed position, according to the present disclosure.

Referring to FIGS. 8-10, the absorbent basket 34 is configured to snap engage with the engagement shaft 32 to retain the absorbent basket 34 to the support body 26. The cover 36 is configured to be selectively disengaged from the absorbent basket 34 by the user to add the scented fluid to the absorbent basket 34. For example, the scented fluid, illustrated as arrow 230, is configured to be poured into the absorbent basket 34 through at least one of the perforated portions 204 to be absorbed and retained by the absorbing material 194. The cover 36 may then be re-coupled over the absorbent basket 34. When the scent emitted by the scented fluid has weakened or is no longer effective, the user may again remove the cover 36 to add more scented fluid to the absorbent basket 34 and re-couple the cover 36 over the absorbent basket 34.

Additionally or alternatively, the user may interchange the absorbent basket 34 with additional absorbent baskets 34. In this way, the user may have a first absorbent basket 232 coupled to the knob assembly 24 for providing a first scent. In order to change the scent or replace the second absorbent basket 234 after a period of time, the user can remove the cover 36 and disengage the first absorbent basket 232 from the engagement shaft 32. The user may then couple a second absorbent basket 234 to the engagement shaft 32 by snap engaging the coupling projections 174 on the second absorbent basket 234 with the coupling protrusions 164 on the engagement shaft 32. The cover 36 may then be coupled over the second absorbent basket 234. In this way, the user may replace the absorbent basket 34 due to wear over time or to interchange the scent. The first and second absorbent baskets 232, 234 may have a substantially similar structure and may be collectively referred to herein as the absorbent basket 34.

Each absorbent basket 34 may be configured to receive the scented fluid. Additionally or alternatively, the absorbing material 194 may have a predefined scent. In such examples, the user may enhance or alter the predefined scent by adding the scented fluid.

Referring still to FIGS. 8-10, the air flowing through the air register assembly 10 is configured to carry the scent from the absorbing material 194 in the absorbent basket 34 into the passenger compartment of the vehicle 12 (FIG. 1). In this way, airflow through the air register assembly 10 is configured to flow through or past the knob assembly 24 to carry the scent retained within the knob assembly 24. The user can control the dispersion of the scent by adjusting the cover 36 between an opened position 240 and a closed position 242. When in the opened position 240, the apertures 38 defined in the annular wall 212 of the cover 36 are aligned with the perforated portions 204 of the outer shell 190 of the absorbent basket 34. Accordingly, the apertures 38 allow fluid communication with the absorbing material 194 through the apertures 38 and perforated portions 204 of the outer shell 190. The fluid communication allows the scent to be carried by air flowing through the air register assembly 10.

As illustrated in FIG. 10, if the user wants to stop the scent from being dispersed, the user may adjust the cover 36 to the closed position 242. In the closed position 242, the apertures 38 are aligned with the solid portions 202 of the outer shell 190 of the absorbent basket 34, which block the apertures 38 and, consequently, block or prevent fluid communication with the absorbent basket 34. In this way, air flowing through the air register assembly 10 does not carry the scent or carries a minimal amount of the scent.

The user may also limit the dispersion of the scent by adjusting the cover 36 to be partially opened, but not fully opened. In such examples, the cover 36 may be disposed between the opened position 240 and the closed position 242 to partially align the apertures 38 with the perforated portions 204.

Generally, the cover 36 is configured to rotate relative to the absorbent basket 34. The internal projections 220 may be configured to slide along an outer surface of the rim 196. Additionally or alternatively, the annular wall 212 of the cover 36 may be configured to rotate relative to the internal projections 220 and the closed end 216. In such examples, the internal projections 220 extend from the closed end 216 and remain stationary relative to the absorbent basket 38. The annular wall 212 may be configured to rotate separately to open and close the apertures 38.

The rotation of the cover 36 about a first predefined degree of rotation adjusts the cover 36 between the opened and closed positions 240, 242 to allow and prevent the dispersion of the scent, respectively. The rotation of the cover 36 about the first predefined degree of rotation may not rotate the engagement shaft 32, allowing separate control of the scent and the damper adjustment system 112. The cover 36 is also configured to rotate about a second predefined degree of rotation, which is larger or a greater degree of rotation than the first predefined degree of rotation. When the cover 36 rotates beyond the first predefined degree of rotation to the second predefined degree of rotation, the cover 36 is configured to rotate the absorbent basket 34, which, consequently, rotates the engagement shaft 32 and the damper adjustment assembly 112 and results in the adjustment of the damper plates 136, 138.

Referring to FIGS. 1-10, the air register assembly 10 includes the knob assembly 24 for housing and dispersing the scented fluid. The air flowing through the air register assembly 10 from the HVAC is configured to flow through and/or adjacent to the absorbent basket 34 to carry the scent from the absorbing material 194 and into the interior compartment 50. The dispersion of the scent into the interior compartment 50 may be adjusted through the opening and closing of the cover 36. The type or strength of scent may also be adjusted by adding the scented fluid to the absorbing material 194 and through the interchangeable absorbent baskets 34.

Use of the present device may provide a variety of advantages. For example, the user may open and close the cover 36 to prevent and allow the dispersion of the scent from the air register assembly 10 and into the interior compartment 50. Additionally, the absorbent basket 34 is reusable, allowing the user to add the scented fluid to the absorbent basket 34 to be used multiple times. Further, the scent is integrated into the air register assembly 10, allowing the sent to be carried with the airflow from the HVAC system. Moreover, the integration in the air register assembly 10 provides a compact and more concealed solution for adding the scent to the vehicle 12. Further, the user may snap engage the cover 36 over the absorbent basket 34, as well as interchange the absorbent basket 34 to change the scented fluid. Moreover, the knob assembly 24, while providing the scent, may also control the position of the barrel 18, the position of the rotating vanes 22, and the position of the damper plates 136, 138. Additional benefits or advantages may be realized and/or achieved.

According to various examples, a vehicle air register assembly includes a housing defining an outlet. A barrel is disposed within the housing proximate to the outlet. The barrel is rotatably coupled to the housing. A frame is coupled to the barrel. Vanes are rotatably coupled to the frame proximate to the outlet. A knob assembly is coupled to the frame adjacent to the vanes. The knob assembly includes a support body defining an interior. Pivots extend from the support body to engage the frame. An engagement shaft extends through the interior of the support body. An absorbent basket is coupled to the engagement shaft. The absorbent basket is configured to absorb a fluid for providing a scent. A cover is selectively coupled over the absorbent basket. The cover defines apertures to provide fluid communication with the absorbent basket. Embodiments of the present disclosure may include one or a combination of the following features:

- the absorbent basket includes an outer shell having perforated portions and an absorbing material disposed within the outer shell;
- the outer shell is constructed of a plastic material and the absorbing material is constructed of at least one of fabric and foam;
- the cover is operable between an opened position providing fluid communication with the absorbent basket via the apertures and a closed position;
- the absorbent basket includes solid portions and perforated portions;
- the apertures are aligned with the perforated portions when the cover is in the opened position and aligned with the solid portion when the cover is in the closed position;
- the cover defines internal projections configured to engage a rim of the absorbent basket;
- the absorbent basket defines ribs; and
- the cover defines internal grooves configured to receive the ribs.

According to various examples, an air register assembly for a vehicle includes a barrel and vanes operably coupled to the barrel. A knob assembly is operably coupled to the barrel and the vanes. The knob assembly includes a support body, at least one absorbent basket selectively coupled to the support body, and a cover selectively coupled over the at least one absorbent basket. The cover is configured to rotate between an opened position and a closed position. The opened position is configured to provide fluid communication with the at least one absorbent basket via apertures defined by the cover. Embodiments of the present disclosure may include one or a combination of the following features:
- the at least one absorbent basket includes an outer shell and an absorbing material within the outer shell;
- the outer shell includes perforated portions for providing fluid communication with the absorbing material;
- the apertures configured to align with the perforated portions when the cover is in the opened position;
- the at least one absorbent basket includes an outer shell with alternating solid portions and perforated portions;
- the apertures are configured to align with the solid portions when in the closed position and the perforated portions when in the opened position;
- the at least one absorbent basket includes a first absorbent basket and a second absorbent basket;
- the first and second absorbent baskets are interchangeable in the knob assembly;
- the at least one absorbent basket includes ribs;
- the cover includes grooves configured to receive the ribs to couple the cover to the at least one absorbent basket;
- each of the vanes and the support body are coupled to a link bar;
- rotation of the knob assembly drives rotation of the vanes via the link bar;
- a support vane extending normal to the vanes; and
- the support vane includes a first vane portion on a first side of the knob assembly and a second vane portion on a second side of the knob assembly.

According to various examples, a knob assembly for a vehicle air register includes a support body defining an interior. An engagement shaft extends through the interior. An absorbent basket includes a base and an outer shell defining an interior. The absorbent basket is coupled to the engagement shaft. An absorbing material is disposed within the interior of the absorbent basket. A cover is selectively coupled over the absorbent basket. The cover defines apertures and is operable between an opened position and a closed position. Embodiments of the present disclosure may include one or a combination of the following features:
- the absorbent basket includes coupling projections extending from the base to snap engage the engagement shaft;
- the cover defines recessed regions extending from proximate an edge thereof to proximate a closed end;
- the apertures are defined in the recessed regions;
- the outer shell includes alternating solid portions and perforated portions; and
- the apertures are aligned with the perforated portions when the cover is in the opened position and aligned with the solid portions when the cover is in the closed position.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle air register assembly, comprising:
a housing defining an outlet;
a barrel disposed within the housing proximate to the outlet, wherein the barrel is rotatably coupled to the housing;
a frame coupled to the barrel;
a damper adjustment assembly;
vanes rotatably coupled to the frame proximate to the outlet; and
a knob assembly coupled to the frame adjacent to the vanes, wherein the knob assembly is configured to rotate about a horizontal axis to rotate the vanes and configured to rotate the barrel about a vertical axis, wherein the knob assembly includes:
a support body defining an interior, wherein pivots extend from the support body to engage the frame;
an engagement shaft extending through the interior of the support body;
an absorbent basket coupled to the engagement shaft, wherein the absorbent basket is configured to absorb a fluid for providing a scent; and
a cover selectively coupled over the absorbent basket, wherein the cover defines apertures to provide fluid communication with the absorbent basket, wherein the cover is configured to rotate a first degree of rotation about a rotational axis to rotate between opened and closed positions to control dispersion of the scent and further to rotate a second degree of rotation to rotate the engagement shaft to adjust the damper adjustment assembly between opened and closed positions.

2. The vehicle air register assembly of claim 1, wherein the absorbent basket includes an outer shell having perforated portions and an absorbing material disposed within the outer shell.

3. The vehicle air register assembly of claim 2, wherein the outer shell is constructed of a plastic material and the absorbing material is constructed of at least one of fabric and foam.

4. The vehicle air register assembly of claim 1, wherein the cover defines a plurality of recessed regions that alternate between solid regions and regions defining the apertures.

5. The vehicle air register assembly of claim 4, wherein the absorbent basket includes solid portions and perforated portions, and wherein the apertures are aligned with the perforated portions when the cover is in the opened position and aligned with the solid portion when the cover is in the closed position.

6. The vehicle air register assembly of claim 1, wherein the cover defines internal projections configured to engage a rim of the absorbent basket.

7. The vehicle air register assembly of claim 1, wherein the absorbent basket defines ribs, and wherein the cover defines internal grooves configured to receive the ribs.

8. An air register assembly for a vehicle, comprising:
a barrel;
a damper adjustment assembly;
vanes operably coupled to the barrel;
a knob assembly operably coupled to the barrel and the vanes, wherein the knob assembly includes:
  a support body;
  at least one absorbent basket selectively coupled to a downstream edge of the support body, wherein the at least one absorbent basket includes a base forming an annular flange and ribs arranged along the base; and
  a cover selectively coupled over the at least one absorbent basket downstream of the support body, wherein the cover includes grooves configured to receive the ribs to couple the cover to the at least one absorbent basket, wherein the cover is configured to rotate between an opened position and a closed position, the opened position configured to provide fluid communication with the at least one absorbent basket via apertures defined by the cover, wherein the cover is configured to rotate a first degree of rotation about a rotational axis to rotate between opened and closed positions to control dispersion of the scent and further to rotate a second degree of rotation to rotate an engagement shaft to adjust the damper adjustment assembly between opened and closed positions.

9. The air register assembly of claim 8, wherein the at least one absorbent basket includes an outer shell and an absorbing material within the outer shell.

10. The air register assembly of claim 9, wherein the outer shell includes perforated portions for providing fluid communication with the absorbing material, the apertures configured to align with the perforated portions when the cover is in the opened position.

11. The air register assembly of claim 8, wherein the at least one absorbent basket includes an outer shell with alternating solid portions and perforated portions, wherein the apertures are configured to align with the solid portions when in the closed position and the perforated portions when in the opened position.

12. The air register assembly of claim 8, wherein the at least one absorbent basket includes a first absorbent basket and a second absorbent basket, and wherein the first and second absorbent baskets are interchangeable in the knob assembly.

13. The air register assembly of claim 8, further comprising:
a link bar, wherein each of the vanes and the support body are coupled to the link bar, and wherein rotation of the knob assembly drives rotation of the vanes via the link bar.

14. The air register assembly of claim 8, further comprising:
a support vane extending normal to the vanes, wherein the support vane includes a first vane portion on a first side of the knob assembly and a second vane portion on a second side of the knob assembly.

15. A knob assembly for a vehicle air register, comprising:
a support body defining a hollow interior between an upstream support and a downstream support;
an engagement shaft including a bracket coupled to the upstream support, an engagement end extending through the downstream support, and a solid body extending therebetween;
an absorbent basket including a base and an outer shell defining an interior, the absorbent basket coupled to the engagement shaft, wherein the engagement end is coupled to the absorbent basket at a downstream edge of the support body;
an absorbing material disposed within the interior of the absorbent basket; and
a cover selectively coupled over the absorbent basket, wherein the cover defines apertures and is operable between an opened position and a closed position, wherein the cover is configured to rotate a first degree of rotation about a rotational axis to rotate between opened and closed positions to control dispersion of the scent and further to rotate a second degree of rotation to rotate the engagement shaft to adjust a damper adjustment assembly between opened and closed positions.

16. The knob assembly of claim 15, wherein the absorbent basket includes coupling projections extending from the base to snap engage the engagement shaft.

17. The knob assembly of claim 15, wherein the cover defines recessed regions extending from proximate an edge thereof to proximate a closed end, and wherein the apertures are defined in the recessed regions.

18. The knob assembly of claim 15, wherein the outer shell includes alternating solid portions and perforated portions.

19. The knob assembly of claim 18, wherein the apertures are aligned with the perforated portions when the cover is in the opened position and aligned with the solid portions when the cover is in the closed position.

* * * * *